US009274997B2

(12) United States Patent
Berenbaum et al.

(10) Patent No.: US 9,274,997 B2
(45) Date of Patent: Mar. 1, 2016

(54) POINT-TO-POINT SERIAL PERIPHERAL INTERFACE FOR DATA COMMUNICATION BETWEEN DEVICES CONFIGURED IN A DAISY-CHAIN

(75) Inventors: Alan Berenbaum, New York, NY (US); Eileen Marando, Bellmore, NY (US); Richard Wahler, St. James, NY (US)

(73) Assignee: SMSC HOLDINGS S.A.R.L., Hauppauge, NY (US)

( * ) Notice: Subject to any disclaimer, the term of this patent is extended or adjusted under 35 U.S.C. 154(b) by 119 days.

(21) Appl. No.: 13/461,787

(22) Filed: May 2, 2012

(65) Prior Publication Data

US 2013/0297829 A1 Nov. 7, 2013

(51) Int. Cl.
*G06F 13/40* (2006.01)
*G06F 13/42* (2006.01)

(52) U.S. Cl.
CPC .................................. *G06F 13/4256* (2013.01)

(58) Field of Classification Search
CPC .................................................. G06F 13/4256
USPC ............................................................. 710/3
See application file for complete search history.

(56) References Cited

U.S. PATENT DOCUMENTS

| 7,228,373 | B2* | 6/2007 | Daly et al. ..................... 710/110 |
| 7,328,399 | B2* | 2/2008 | Marshall et al. ............... 714/821 |
| 2004/0245946 | A1* | 12/2004 | Halter ............................ 315/312 |
| 2007/0016699 | A1* | 1/2007 | Minami ........................... 710/20 |
| 2008/0140899 | A1* | 6/2008 | Oh et al. ......................... 710/300 |
| 2011/0153888 | A1* | 6/2011 | Sun et al. ....................... 710/107 |
| 2012/0328235 | A1* | 12/2012 | Christensen et al. ........... 385/14 |

\* cited by examiner

*Primary Examiner* — Henry Tsai
*Assistant Examiner* — John Roche
(74) *Attorney, Agent, or Firm* — Slayden Grubert Beard PLLC

(57) ABSTRACT

The present disclosure provides an improved point-to-point serial peripheral interface, a system comprising an improved point-to-point serial peripheral interface, and a method for use in a system comprising an improved point-to-point serial peripheral interface. A master comprises a SPI initiating port. Each slave comprises at least one SPI receiving port and at least one SPI forwarding port. The master provides a set of SPI signals to the SPI receiving port of the first slave in the chain, and the entire SPI signals are forwarded via the SPI forwarding port of each of the slaves until the SPI transaction reaches a target slave, which is identified by an in-band device addressing mechanism.

25 Claims, 6 Drawing Sheets

POINT-TO-POINT SERIAL PERIPHERAL INTERFACE FOR DATA COMMUNICATION BETWEEN DEVICES CONFIGURED IN A DAISY-CHAIN

TECHNICAL FIELD

The present invention relates to a data communication interface, and more particularly to a system and method for implementing a Serial Peripheral Interface ("SPI") in a daisy-chain.

BACKGROUND

Serial Peripheral Interface Bus or SPI is a synchronous serial data link that operates in either a full or a half-duplex mode. Devices communicate in master-slave fashion, in which the master initiates the data transmission by using a set of signal line interface. A typical SPI includes a serial clock line ("SCLK"), which is sent from the master to all slaves. It also includes a chip select signal ("CS") line for selecting the slave the master communicates with. Further, most modern SPIs use two data lines, a master-out-slave-in line ("MOSI") and a master-in-slave-out line ("MISO"), for the full duplex data communication between the master and slaves.

SPI is a single-master communication protocol. At the basic level, a system linked in a typical SPI includes a single master and a single slave, in which the devices communicate in a point-to-point topology. The master initiates SPI transactions by activating the clock signal at a clock frequency usable by both the master and the slave. The master provides data on the MOSI line while it samples data on the MISO line. In a more complex system having multiple slaves, however, additional hardware mechanisms or software protocols are needed for the master to communicate with a specific slave within a group of linked slaves. For instance, the master uses a global SCLK line and one global data line such as MOSI line to command all slaves. The master allots an independent CS line to each of the slaves to activate the slave it wants to communicate with, thereby creating a point-to-multipoint topology. In this SPI configuration, the SCLK line and the data line are shared among all slaves, but only the slave with its CS signal active will acknowledge and respond to the master's command.

This classic SPI configuration, however, comes with a number of problems. First, the number of slave devices that can connect to the master device is limited to the number of CS outputs available at the master. Each additional slave adds to the cost and layout complexity of the system. Second, because the global SCLK line is distributed from the master to all slaves, the capacitive load on the master's SPI port increases with each additional slave in the system. The increase in the capacitive load creates various electrical issues, such as noise and skew on the signal, which negatively affects the overall system stability.

Attempts have been made to solve some of the problems described above. For example, a daisy-chain configuration has been used to minimize the number of CS outputs on the master. In the conventional SPI daisy-chain configuration, the data output of each slave is connected to the data input of the next device in the chain, and the final slave data output is connected to the MISO line on the master. On each group of clock pulses, the SPI port on each slave forwards an exact copy of data received from the preceding device to the next device in the chain, thereby forming a logical shift register. The classic daisy-chain SPI configuration uses only a single CS line from the master to control all slaves. The master outputs a series of commands in a specific order to configure the slaves in the chain, and all slaves in the chain execute the commands written on them upon assertion of the CS signal.

In this classic daisy-chain configuration, the total number of slaves is no longer limited to a finite set of CS outputs on a master. This configuration, however, still operates with a global clock line distributed from the master to all slaves. Not only did the classic daisy-chain SPI configuration fail to solve the excessive capacitive load problem, it introduced a new problem: the SPI interface does not permit any wait states. Since all slaves are connected to the same CS line, all slaves respond to the master command, acting as a large shift register. All slaves in the chain operate as a single device, and each SPI transaction involves every slave in the chain. In other words, the slaves must accept or return data on every clock edge so long as the master is clocking the SPI clock. Accordingly, the standard SPI daisy-chain configuration cannot be used when the slaves require a variable delay before responding to a command.

It would be highly desirable to have an improved serial peripheral interface that does not suffer from the capacitive load problem regardless of the number of slaves in the chain. It would also be desirable to have an improved serial peripheral interface that provides a wait-state functionality, so that the slaves can take a variable number of clock cycles before respond to the master's command. Such SPI configuration would provide a truly flexible and reliable inter-chip data communication interface.

SUMMARY

One embodiment of the present disclosure is an improved serial peripheral interface ("SPI") for communicating data from a master to one or more slaves connected in a chain. Each slave is configured to forward the entire set of SPI signals received from its preceding device to the next slave in the chain until the set of SPI signals reaches to a target slave for process the SPI transaction. The set of SPI signals forwarded from one slave to another slave includes a serial clock signal (SCLK), a chip select signal (CS), a master-out-slave-in signal (MOSI) and a master-in-slave-out signal (MISO).

The first n-bits of data of a SPI transaction initiated by the master are used as a device select field for identifying the target slave for the SPI transaction. In one embodiment, the device select field indicates a number of slaves to skip in the chain. In this configuration, all slaves in the chain are located at address 0, and each slave that receives a SPI transaction with non-zero device select field forwards the SPI transaction to the next slave in the chain with the device select field reduced by 1. When a slave receives the SPI transaction with the device select field set to 0, it processes the SPI transaction. Instead, the device select field may indicate a specific target device in the chain, in which each slave in the chain is assigned with a unique device address. In this configuration, the slave processes the SPI transaction when the device select field of the received SPI transaction matches the slave's unique device address. Otherwise, the slave simply forwards the entire SPI signals to the next device in the chain.

In addition, if a slave determines itself as the target slave for the given SPI transaction, it provides a slave ready signal to the master to indicate that valid data are ready for the master to clock-in via the MISO or via both the MISO and MOSI. For purposes of this application the term "SPI transaction" and "SPI operation" are used interchangeably to describe any commands or instructions, such as SPI write and/or SPI read, initiated and carried out by the linked devices.

One aspect of the present disclosure relates an improved serial peripheral interface ("SPI") for communicating data from a master to one or more slaves connected in a chain. The slaves linked in the improved point-to-point SPI comprise at least one SPI receiving port and at least one SPI forwarding port. While the SPI receiving port is configured to receive the entire set of SPI signals from the immediately preceding device in chain, the SPI forwarding port is configured to forward the set of SPI signals received at the SPI receiving port to another slave's SPI receiving port. The master initiate a SPI transaction by providing the entire set of SPI signals to one of the slaves in the chain, and the slaves forward the entire set of SPI signals until the set of signals reaches to the target slave that processes the SPI transaction. Clocking of the slaves is achieved by means of clock signals that are passed from one slave to the next. Each slave re-clocks the incoming clock signal at the SPI receiving port to generate clock signals of the same clock rate for the next slave at the SPI forwarding port.

In accordance with a further aspect of the present disclosure, there is provided a method for communicating data between the devices linked in a point-to-point serial peripheral interface. The method includes initiating a SPI transaction by providing a set of SPI signals from the master to the first slave in the chain. The first n-bits of data transferred on the MOSI line for the given SPI transaction is used for the device selection field for identifying the target slave for the SPI transaction. The first slave that received the SPI signals from the master forwards the entire set of SPI signals to the next slave in the chain until a slave receiving the set of SPI signals determines itself as the target slave. The SPI signals being forwarded here also include the serial clock signal (SCLK), the chip select signal (CS), the master-out-slave-in signal (MOSI) and the master-in-slave-out signal (MISO). To provide a slave ready signal to the master, the target slave can cause a state change on MISO signal. In one embodiment, each slave is configured to forward the set of SPI signals as soon as the slave determines that the SPI transaction is not intended for itself. Accordingly, the forwarding of SPI signals can be buffered for the amount of data necessary for each slave to verify whether it is the target slave. In an alternative embodiment, each slave is configured to forward the set of SPI signals by providing the set of SPI signals on a SPI forwarding port as soon as the signals are received at a SPI receiving port.

Yet another aspect of the present disclosure relates to an improved point-to-point serial peripheral interface (SPI) for communicating data between a master and one or more of slaves, in which the slave is configured to provide a slave ready signal to the master to indicate that the slave is ready to process a SPI transaction. The slave ready signal is provided to the master by changing the state on one or more of the data lines, such as the master-out-slave-in (MOSI) line or the master-in-slave-out (MISO) line. Upon verifying that the linked slaves are ready to receive a SPI transaction, the master initiates the SPI transaction by providing a set of SPI signals to one of the slaves, which then forwards the received set of SPI signals to another slave until the SPI transaction reaches to the target slave. In some embodiments, the timing of providing the slave ready signal might be different based on the type of SPI transaction. For SPI transactions that do not involve returning data back to the master, the slave can provide the slave ready signal to the master upon identifying itself as the target slave, if the slave ready signal is necessary. For SPI transactions involving return data to the master, the target slave can provide the slave ready signal to the master when it is ready to return valid data.

BRIEF DESCRIPTION OF THE FIGURES

The drawing figures described below set out and illustrate a number of exemplary embodiments of the claimed invention. Throughout the drawings, like reference numerals refer to identical or functionally similar elements. The drawings are illustrative in nature and are not drawn to scale.

Figure 1:
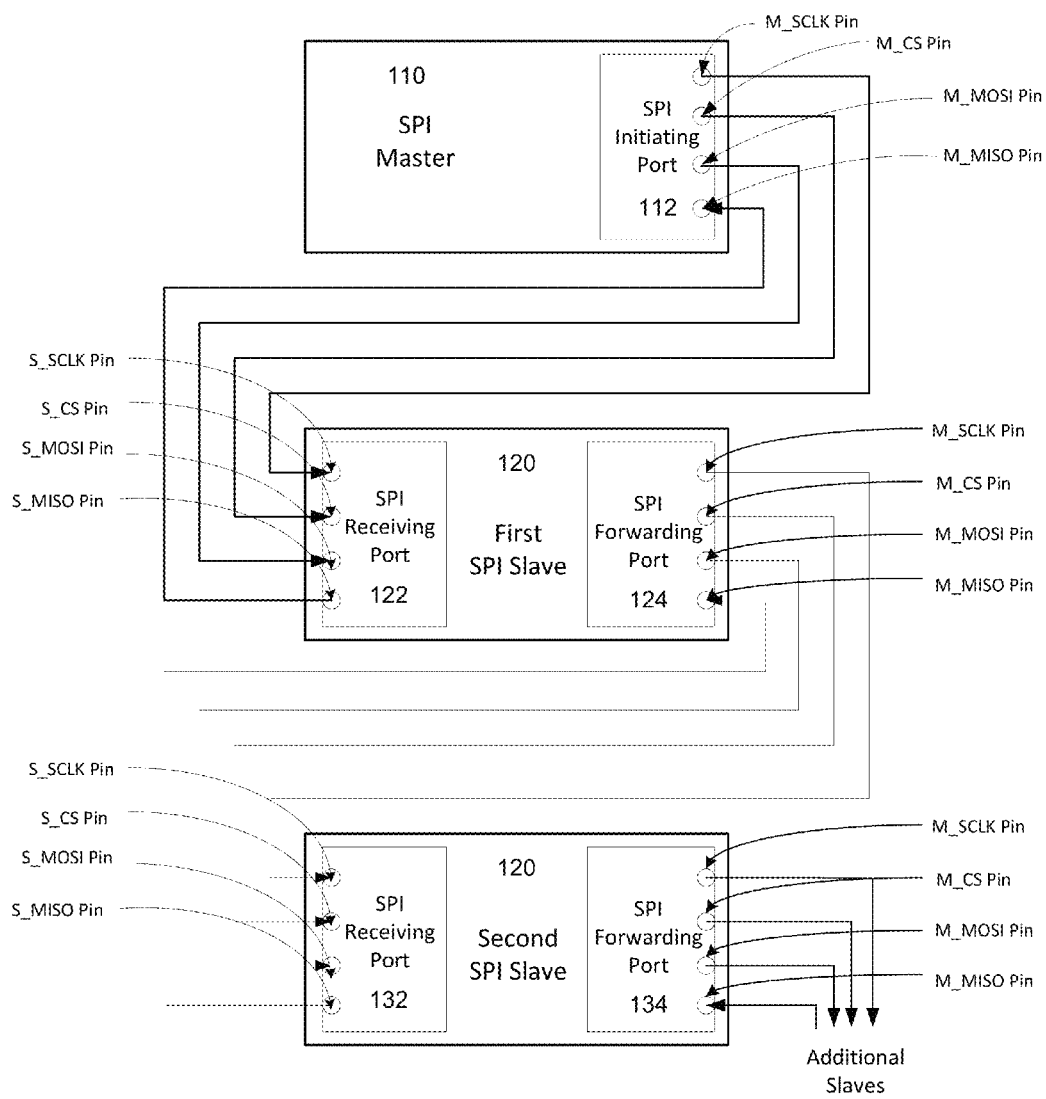
FIG. 1 illustrates an exemplary improved point-to-point SPI according to one embodiment of the present disclosure.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, are intended to cover all modifications, equivalents, and alternatives falling within the spirit and scope of the present invention as defined by the appended claims.

DETAILED DESCRIPTION

Overview

The following detailed description is made with reference to the figures. Exemplary embodiments are described to illustrate the claimed invention, not to limit its scope, which is defined by the appended claims.

An improved point-to-point serial peripheral interface as well as methods and system for implementing such a SPI are described herein. The SPI is serially chained by configuring each slave to forward the entire SPI interface. That is, all SPI signals, including the serial clock ("SCLK"), the chip select ("CS"), the master-out-slave-in ("MOSI") and the master-in-slave-out ("MISO"), are forwarded from one slave to the next slave in the chain. Each slave in the chain, while being clocked by the SCLK received from its immediately preceding device, forwards the entire set of SPI signals to the slave that immediately follows. To achieve this, each slave is provided with two SPI ports: a receiving port and a forwarding port. The improved point-to-point SPI uses an in-band slave select protocol to select an individual slave, referred herein as a target slave, for data transfer. For example, the first n-bits of the data transferred from the master to the slave can be a device select field, and only the slave identified by the device select field responds to the incoming SPI transaction. Slaves that are not selected by the master simply pass the entire SPI signals received at the incoming SPI receiving port to the SPI forwarding port. The improved point-to-point SPI also includes a protocol for signaling the master that the target slave is ready to return valid data. For example, during a read operation, a change of state on the MISO signal by the target slave can signal the master that the data on the MISO is valid. In such a configuration, the master may search for the slave ready signal after it has sent the slave address. Following the first cycle after the slave ready signal on the MISO, data is returned to the master without any wait states.

As described above, the improved point-to-point SPI operates without any global SCLK or CS signal. Instead, all SPI signals are point-to-point, forwarded from one device to the next. This configuration eliminates the electrical issues, such as the excessive capacitive load problem on the master as well as the clock over/under-run problems caused by connecting multiple slaves to the single clock line provided from the master. Further, the slave ready signaling mechanism permits the slaves to take a variable number of cycles before responding to the master's command.

Exemplary Embodiments

FIG. 1 shows an embodiment of improved point-to-point SPI implemented in an exemplary master-slave arrangement according to an embodiment of the present disclosure. The illustrated arrangement comprises a master 110, a first slave 120, and a second slave 130, wherein the devices are linked in a serial chain. The master 110 comprises an SPI initiating port 112 having a master SCLK pin ("M_SCLK"), a master CS pin ("M_CS"), a master MOSI pin ("M_MOSI"), and a master MISO pin ("M_MISO") for providing the respective signals to the first slave 120 in the chain. Unlike the master 110, each slave comprises two ports. For instance, the first slave 120 comprises an SPI receiving port 122 having a slave SCLK pin ("S_SCLK"), a slave CS pin ("S_CS"), a slave MOSI pin ("S_MOSI"), and a slave MISO pin ("S_MISO"), which are connected to their corresponding pins in the master 110 for receiving the respective SPI signals. The first slave also comprises an SPI forwarding port 124. Similar to the SPI receiving port 122, the SPI forwarding port 124 comprises a master SCLK pin ("M_SCLK"), a master CS pin ("M_CS"), a master MOSI pin ("M_MOSI"), and a master MISO pin ("M_MISO"), and these pins are connected to their corresponding pins in the SPI receiving port 132 of the second slave 130. Accordingly, the signals received by the second slave 130 are provided as if the signals are provided from the master 110. As shown in this figure, there is no global signal from the master 110 being shared between multiple slaves. Instead, the all of the SPI signals from the master 110 are point-to-point, forwarded from one slave to the next slave in the chain, until the entire set of signals reach the target slave.

Figure 2:
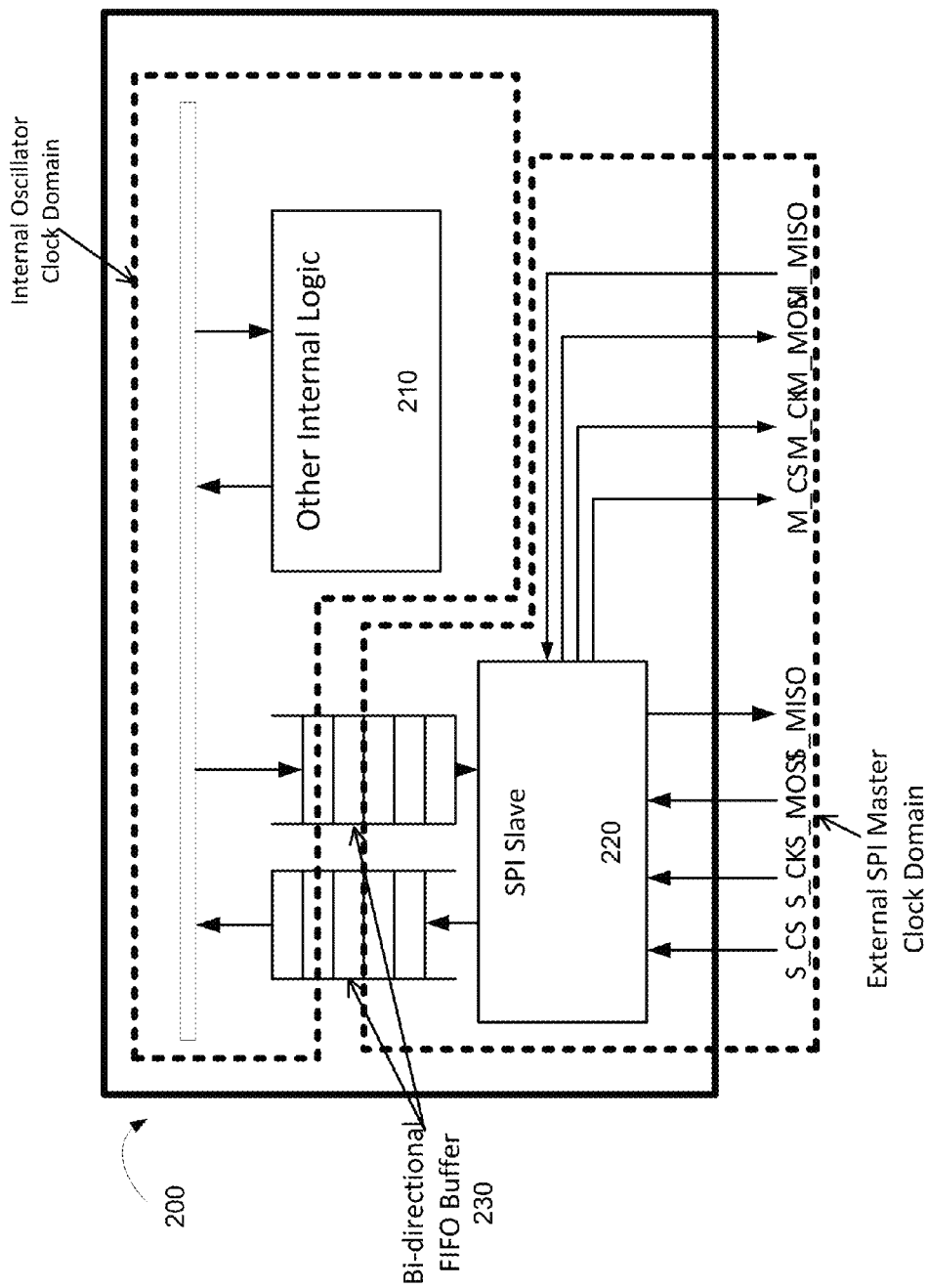
FIG. 2 is a block diagram illustrating an exemplary slave device of an improved point-to-point SPI according to one embodiment of the present disclosure.

FIG. 2 illustrates an exemplary slave device 200 having an internal logic block 210 and an SPI slave logic block 220. As described above, all of the incoming SPI signals, including the SPI clock signal, are forwarded from one slave to another as if the signals are coming from the master. In this figure, the internal logic block 210 is controlled by the slave's own internal clock domain. The SPI logic block 220, however, is clocked by the incoming SPI clock signal, S_CK, and thus operates in the external SPI master clock domain. As shown, one or more of bi-directional first-in-first-out ("FIFO") buffers 230 can be used to cross the clock domains when the SPI transaction is intended for the logic operating in the slave's internal clock domain.

Figure 3:
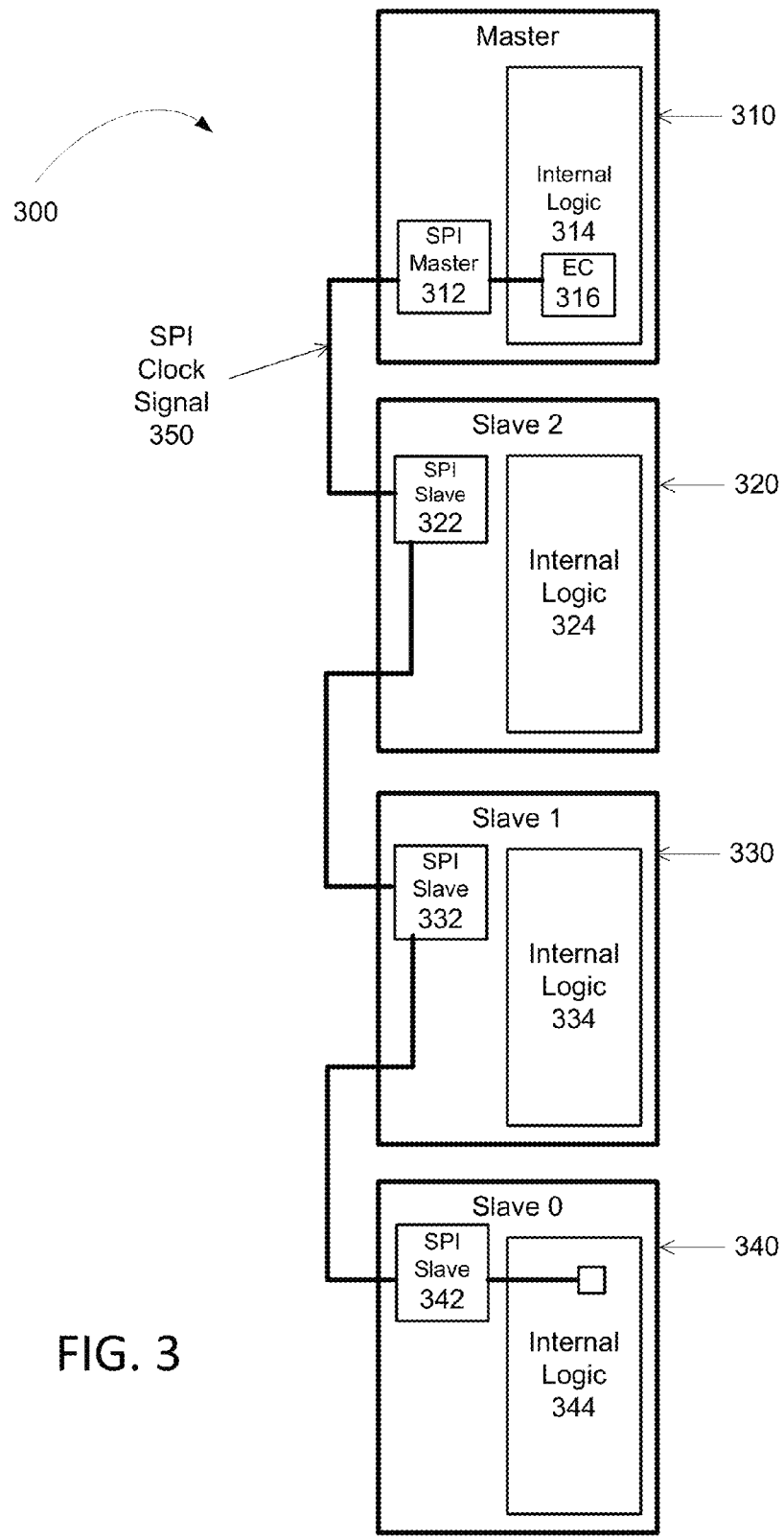
FIG. 3 is a high level block diagram illustrating an exemplary improved point-to-point SPI according to one embodiment of the present disclosure.

FIG. 3 illustrates an exemplary system 300 according to an embodiment of the present disclosure. The exemplary system 300 comprises one master 310 and three slave devices, 320, 330 and 340, in which all devices are linked by the point-to-point SPI described in the present disclosure. As shown in the figure, each of the devices in the chain comprises internal logic that operates in its own separate internal clock domain. For instance, the embedded controller ("EC") 316 operates in the master's internal clock domain. Likewise, each of the internal logics 324, 334 and 344, operate in their respective slave device's own internal clock domain. Each device further comprises an SPI logic block. As shown, the master 310 comprises the SPI master 312, and slave devices, 320, 330 and 340 comprise an SPI slave 322, 332 and 342, respectively.

In FIG. 3, the SPI master 312, which is controlled by the EC 316, operates in the master internal clock domain. As described above, each slave's SPI logic block is clocked by the incoming SPI clock signal 350 received from the immediately preceding device in the chain. Accordingly, the SPI slave 322 of the slave device 320 is clocked by the SPI clock signal received from the SPI master 312 that operates in the master's clock domain. Similarly, the SPI slave 332 of the slave device 330 is clocked by the SPI clock signal forwarded by the SPI slave 322. Further, the SPI slave 342 of the slave device 340 is clocked by the SPI clock signal forwarded by the SPI slave 332. In this setting, all SPI logic blocks in the chain remain in the master's clock domain even without having to bus a direct clock signal from the master to each and every SPI slaves. When the chain extends with more slaves, the timing of the SPI clock at each slave can skew from the SPI clock of the master. Nevertheless, the SPI clock at every slave as well as the master will toggle at the same rate. Accordingly, data transfers will not over-run or under-run at either the slave or the master.

Device Addressing Mechanism

Figure 4:
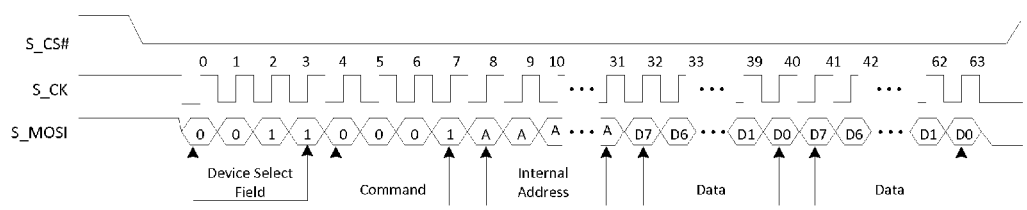
FIG. 4 is a timing diagram illustrating an exemplary SPI transaction using an embodiment of the improved point-to-point SPI in accordance with the present disclosure.

Devices linked in a chain using the improved point-to-point SPI of the present disclosure do not form a shift register. For this reason, a mechanism for the SPI master to select a SPI slave from the chain is needed to communicate with the selected SPI slave. In one embodiment, the first n-bits of the data in a SPI transaction transferred from the master to the slave include a device select field as well as a command, such as read or write. FIG. 4 is a timing diagram illustrating the operation of an exemplary SPI transaction at the master according to an embodiment of the present disclosure. In this example, the first 4 bits of the data frame on the S_MOSI line contain the device select field, followed by a 4 bit command. The data frame on the S_MOSI also includes a 24 bit address that is internal to the slave, which is different from the global device address indicated by the device select field. Data, which is organized in an 8-bit word at a time, follows immediately after the 24 bit address field. In some other embodiments, however, the data can be organized in various other sizes. It should also be noted that the order of the data structure described above may vary in some other embodiments.

The device select field can be used in multiple ways to implement the device select mechanism. In one embodiment, the device select field may indicate the number of devices to skip in a chain of linked devices before the SPI transaction reaches the target device. All devices with a slave SPI interface are located at address 0. In this setting, a SPI slave that receives a SPI transaction from the SPI master with the device select field set to 0 responds to the command. If the device select field is non-zero, the SPI slave forwards the transaction to the next device in the chain, but with the device select field reduced by 1. Referring back to the FIG. 3, to communicate with the third slave device 340, the master 310 generates a SPI transaction with the address field set to 2. Although not shown in FIG. 3, each slave device may include a 4-bit decrementer. The first slave device 320 decrements the device select field of the SPI transaction by 1, and forwards the SPI transaction to the second slave device 330. Since the SPI transaction received by the second slave device 330 also contains a non-zero device select field, the second slave device 330 forwards the SPI transaction to the target slave device 340 after reducing the device select field by 1. As mentioned above, all slave devices, including the third slave device 340, are located at address 0. When third slave device 340 receives the SPI transaction with the device select field set to 0, it determines itself as the target device, and processes the SPI transaction. While the target slave determination can be done by comparing the device select field and the device address, a simple zero detecting can also be used for the same purpose.

In another embodiment, the device select field specifies a device address. A slave device receiving a SPI transaction that matches its device address processes the SPI transaction. If the device select field and the device address do not match, the SPI transaction is forwarded to the next device in the chain. In this embodiment, each slave device needs to have a unique device address. For instance, each slave devices can be configured to save a 4-bit device address. The addresses of devices in the chain do not have to be in any order; it is sufficient that they are unique to each SPI slave devices. The device address can be assigned physically, for example, by using pins, where n pins can be used to assign $2^n$ unique addresses. This implementation, however, requires the total number of slave devices to be defined at the design time and makes it harder to add more slaves later. Accordingly, in the preferred embodiment, the device address is dynamically assigned by having the master enumerate a unique device address to each SPI slave device before initiating normal SPI transactions.

For example, all SPI slave devices default to a specific address upon power-cycling the system. Because all SPI slave devices are located at the same default address, only the first slave device in the chain will respond to the command sent to that default address. Referring to FIG. 3, the SPI master 312 initializes a counter "I" to 2, and sends a "set device address to 'I'" command to the slave located at the default address 0. The command sets the first slave device 320 to address 2. The SPI master 312 then decrements the counter "I" by 1. The SPI master 312 sends an identical command to the slave located at the default address 0. Note that the first slave device 320 was assigned address 2 by the previous command. Therefore, the second slave device 330, located at the default address 0, responds to the command and is assigned the address 1. At this point, the SPI master 312 ends the enumeration sequence, and the third slave device 340 remains at address 0. In this implementation, adding or removing slaves in the chain is just a matter of programming rather than redesigning the hardware. The dynamic device address enumeration scheme coupled with the device selection protocol allows this improved point-to-point SPI to have a varying number of slaves at any time.

Broadcast

Sometime, a master needs to broadcast messages to all slaves in the chain. In such cases, a specific address, for example 0xF, can be reserved to provide a broadcast mechanism. If a slave receives a SPI transaction with an address of 0xF, the slave both processes the message and forwards the message to the next slave in the chain without changing the device select field. Accordingly, all slaves in the chain will process the SPI transaction. Although the broadcast mechanism supports broadcasting all types of commands to all SPI devices on in the chain, SPI read transactions may require additional protocol than processing SPI write transactions. When all slaves return data at the same time, it can be difficult for the master to synchronize the slaves and distinguish which data came from which slave. Accordingly, in one embodiment, the broadcast mechanism applies only to SPI write transactions.

Slave Ready Signaling

Figure 5:
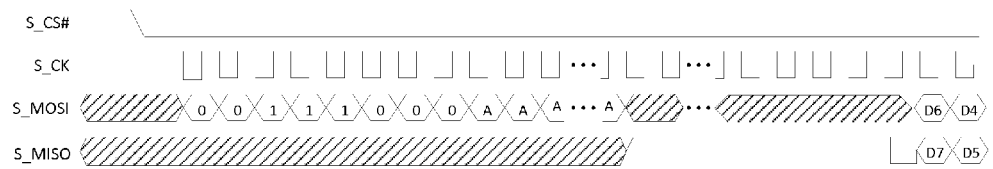
FIG. 5 is a timing diagram illustrating an exemplary SPI read transaction using an embodiment of the improved point-to-point SPI in accordance with the present disclosure.

In contrast to the master and slaves linked in a standard SPI daisy-chain that form a single ring, the devices linked using the SPI of the present disclosure utilize a dedicated data-out channel and a dedicated data-in channel. Accordingly, the slaves provide a slave ready signal to the master on the data line, such as MISO signal line, during a SPI read transaction to indicate that the slave is ready to return valid data. FIG. 5 is a timing diagram illustrating an exemplary SPI transaction, for example a SPI read, according to an embodiment of the present disclosure. In one embodiment the slave sets the MISO signal high, and the MISO signal remains high until is the target slave is ready to return valid data. The target slave provides the slave ready signal to the master by asserting the MISO signal low. In this example, the master only looks for the slave ready signal on S_MISO line after it completes sending the slave address. The state of S_MISO is therefore immaterial until that point, and thus is illustrated as indeterminate in FIG. 5. In one embodiment, the slave may drive the MISO signal high as soon as the S_CS is asserted. The master clocks in data on the cycle following the first cycle S_MISO is low. The exemplary transaction in FIG. 5 illustrates a double-data-rate transfer, in which both S_MOSI and S_MISO are used to return valid data. However, it should be noted that the improved point-to-point SPI of the present disclosure can be implemented with additional wires to provide a higher data transfer rate. Also, in an alternative embodiment, the improved point-to-point SPI can be implemented to operate in single-data-rate, in which the data from the target slave to the master only appear on S_MISO.

Forwarding SPI Transactions

For a SPI write transaction, the signals on the SPI forwarding port mirror those on the SPI receiving port, delayed by sufficient time for re-clocking the signals. As discussed above, the signals forwarded between the slaves for a SPI read transaction differ from the signals for a SPI write transaction because the SPI read transaction involves providing the slave ready signal to the master.

Figure 6:
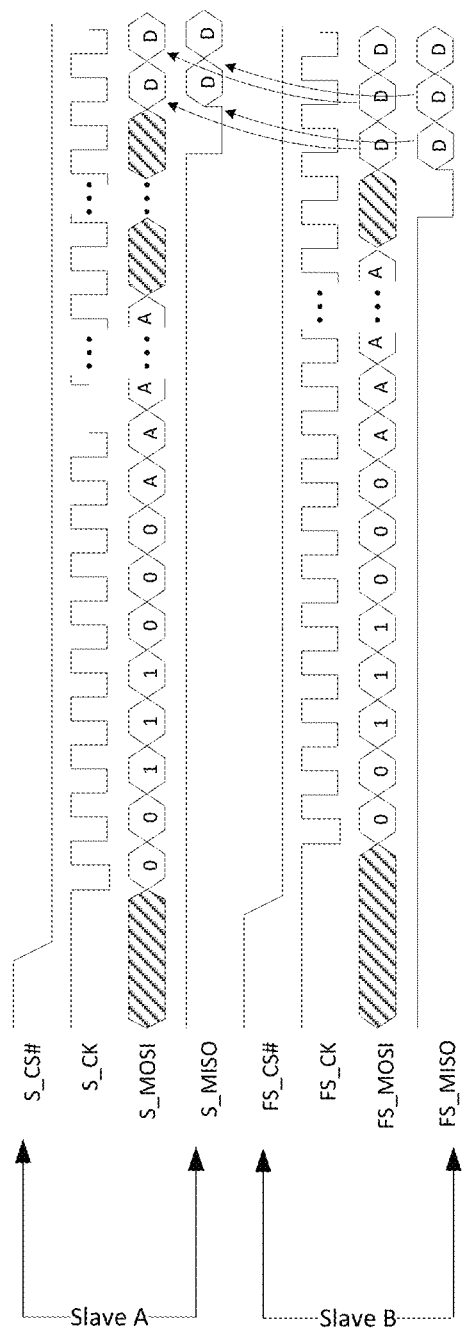
FIG. 6 is a timing diagram illustrating an exemplary SPI forwarding transaction using an embodiment of the point-to-point SPI in accordance with the present disclosure.

FIG. 6 is a timing diagram illustrating an exemplary signal operation on slave A and the target device, slave B, when passing a SPI read transaction according to an embodiment of the present disclosure. Again, the transaction is illustrated with double-data-rate reads on both MOSI and MISO signal lines, but it should be understood that other data transfer rates are also feasible.

In FIG. 6, the signals at slave B are delayed from the signals at slave A by the time spent on re-clocking the signals at slave A. As described above, the master clocks-in data on the cycle following the first low cycle on S_MISO. Note that the low MISO signal on Slave B occurs one cycle before the same on Slave A. This is because Slave A does not know whether the data is ready until it is told by the next slave, e.g., Slave B in the chain.

When the SPI transaction is targeting a single slave in the middle of the chain, there is no need for forwarding the SPI transaction beyond the target slave. Accordingly, in one embodiment, each of the slaves are configured to de-assert the CS signal on the SPI forwarding port upon determining itself as the target slave, thereby terminating the command as well as forwarding the transaction to the slaves later in the chain. By clocking only the slaves necessary for a given SPI transaction, the improved point-to-point SPI of the present disclosure can provide a reliable, efficient, and power saving data communication interface.

Exemplary Methods

Figure 7:
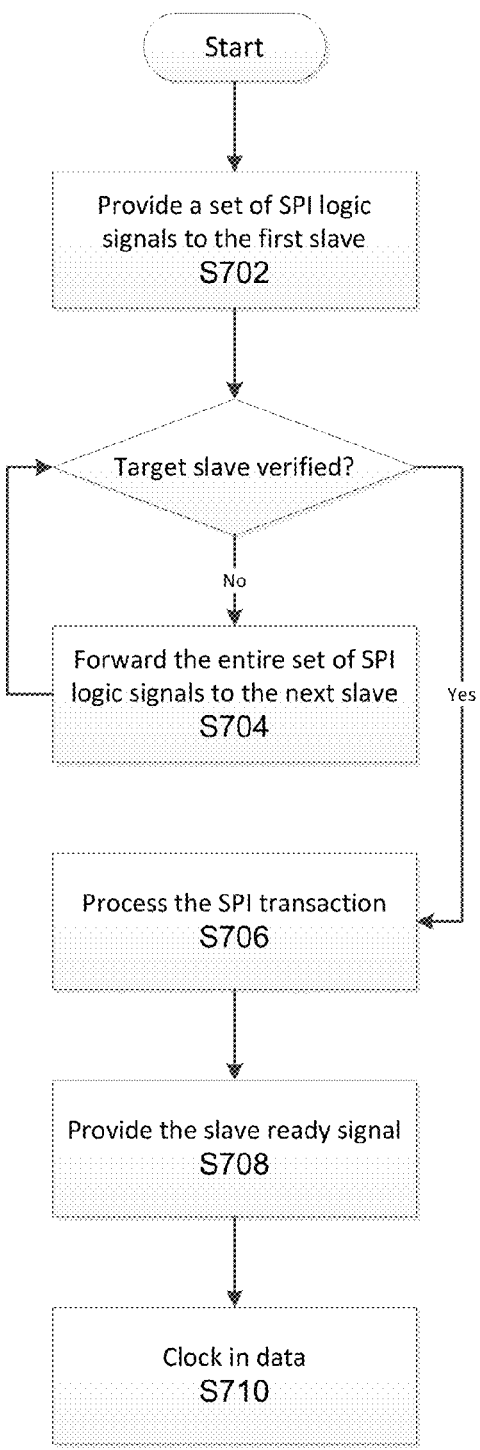
FIG. 7 is a flowchart illustrating an exemplary method of using the improved point-to-point SPI in accordance with the present disclosure.

FIG. 7 shows a simplified flowchart illustrating a method in accordance with an embodiment. The method 700 illustrated in FIG. 7 may be used in conjunction with any of the systems or devices shown in the previously described figures. In various embodiments, some of the steps may be performed concurrently, or in a different order than shown, or may be omitted. Additional steps may be performed as desired. The method 700 may operate as follows. In S702, the master initiates a SPI transaction by providing the entire set of SPI signals to the first slave in the chain. As described above, the SPI transaction incorporates an in-band device selection mechanism for selecting a target slave in the chain. In some embodiments, the first 4 bits of the data transferred on the MOSI line represent the relative position of the target slave from the master. In some other embodiments, first 4 bits of the data transferred on the MOSI line represent a unique device address of the slaves assigned by the master. As described, a dynamic address enumeration scheme is preferred for varying the number of slaves after the initial design phase.

In S704, the first slave forwards the entire set of SPI signals received from its immediately preceding device to the next slave in the chain unless the slave determines itself as the target slave. As explained above, the target slave determination can be carried out by using the device selection field provided via the first n-bits of data on the MOSI signal line. In some embodiments, each slave performs the target slave verification after receiving only the first n-bits necessary for the verification. For example, the data forwarding can be buffered by 8 bits. The slave receiving the SPI signal performs the target slave verification process using the first 4-bit device selection field and the next 4 bits defining a command, e.g., read or write. In this case, the slave can stop forwarding the SPI signals to the slaves further in the chain when it determines itself as the target slave, and process the SPI transaction. All slaves that are not necessary or otherwise not involved in the given SPI transaction are not clocked, thereby improving the overall system power efficiency.

Alternatively, each slave can perform the target slave verification process after forwarding the SPI signals. Here, each slave is configured to forward every bit to the next slave, then performs the target slave verification process. When a slave determines itself to be the target slave using any of the device addressing mechanism, it processes the received SPI transaction and provides the slave ready signal if needed. Regardless of when the target slave verification takes place, a specific address can be reserved for broadcasting an SPI transaction to all slaves in the chain. To broadcast a SPI transaction, the slaves can be configured to forward the SPI transaction to the next slave even if it determines itself as the target slave. Each slave, however, forwards the SPI transaction without modifying the device selection field of the SPI transaction. That way, the SPI transaction remains as the broadcasted SPI transaction, and each of the slaves continues to forward the SPI transaction.

In S706, the target slave processes the SPI transaction, and provides the slave ready signal in S708 to facilitate a read operation. For example, the MISO signal is set high as soon as the CS signal is active, and remains high until the target slave asserts it low for one cycle. In S710, the master clocks in data on the cycle following the first low cycle on the MISO signal. While it is possible to use only the MISO line to return data from the slave to the master, in a preferred embodiment, the point-to-point SPI utilizes all available data lines (e.g., both the MOSI and MISO lines) for transferring data, thereby achieving a double-data-rate transfer.

In the embodiments described herein, the point-to-point SPI of the present disclosure does not use any global signal. Instead, all SPI signals forwarded from one device to the next device in the chain, using a point-to-point SPI topology for multiple slaves linked in a serial chain. Because all SPI slaves are clocked by the forwarded SPI clock signal, all SPI slaves remain in the master's clock domain and toggle at same rate. This configuration eliminates the capacitive load problem and other signal integrity issues, such as noise, distortion, and loss, which are results of busing a single clock line to multiple slaves. Accordingly, the SPI link can run at higher speed with enhanced system stability. Further, with the in-band device selection mechanism, the linked devices no longer function as a shift register. It is no longer necessary to clock every slave device for every cycle of an SPI transaction. Not only does the device selection mechanism provide an efficient data communication for the master, but it also saves system power. Lastly, the slave ready signal mechanism of the point-to-point SPI of the present disclosure permits the use of a SPI slave that requires a variable number of cycles to respond to the SPI master's command.

The specification has described a point-to-point SPI as well as a system and method suitable for implementing said point-to-point SPI. The invention is, however, not limited to these examples. Embodiments have been described above with the aid of functional building blocks and timing diagrams illustrating the implementation of specified functions and relationships thereof. The boundaries of the functional building blocks and signals have been arbitrarily defined herein for the convenience of the description. Alternative boundaries can be defined so long as the specified functions and relationships thereof are appropriately performed. Also, the illustrated steps are set out to explain the embodiment shown, and it should be anticipated that ongoing technological development will change the manner in which particular functions are performed. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. An improved point-to-point serial peripheral interface (SPI) for communicating data between a master and one or more slaves in a chain, wherein the master only connects to the first slave in the chain via said serial peripheral interface and wherein each of the slaves is configured to forward an entire set of SPI signals received from its preceding device in the chain to another slave in the chain until said set of SPI signals reaches to a target slave for processing a SPI transaction, wherein the SPI comprises:
    data input and data output pins, each of which is configured to send and receive signals from a respective data input and data output line;
    a serial clock (SCLK) pin configured to receive a SCLK signal on a SCLK line; and
    a chip select (CS) pin configured to receive a CS signal on a CS line, and
    wherein upon receiving a read command, the target slave is configured to provide a slave ready signal on the SPI data output line to the master to indicate the target slave is ready to process the SPI transaction.

2. The improved point-to-point SPI of claim 1, wherein the master integrates a device select field in the set of SPI signals for identifying the target slave for processing the SPI transaction, wherein the first n-bits of data of transferred via one or more of the data lines for the SPI transaction define the device select field for identifying the target slave in the chain.

3. The improved point-to-point SPI of claim 2, wherein the target slave is configured to drive the data output line to a first logic state and when the target slave is ready to return data on the data output line, to drive the data output line to a second logic state.

4. The improved point-to-point SPI of claim 3, wherein the target slave is configured to drive the data output line to the first logic state after receiving an address.

5. The improved point-to-point SPI of claim 2, wherein the slave is configured to stop forwarding the set of SPI signals when the slave is identified as the target slave for said SPI transaction.

6. The improved point-to-point SPI of claim 3, wherein the first logic state is a logic high state and the second logic state is a logic low state.

7. The improved point-to-point SPI of claim 2, wherein a broadcast address is reserved for broadcasting the SPI transaction to all slaves in the chain, and when the device select field of the SPI transaction is set to the broadcast address, the slaves are configured to process the SPI transaction and forward the entire set of SPI signals to the following slave in the chain without modifying the device select field.

8. The improved point-to-point SPI of claim 2, wherein the device select field specifies a number of slaves to skip in the chain of which every slave is located at address 0, and wherein: for a SPI transaction with the device select field set to 0, the slaves are configured to process the SPI transaction as the target slave; and for a SPI transaction with a non-zero device select field, the slaves are configured to forward the SPI transaction to a following slave in the chain with the device select field reduced by 1.

9. The improved point-to-point SPI of claim 2, wherein the device select field specifies the target slave in the chain, in which each of the slaves are assigned with a unique device address, and wherein each slave is configured to process the SPI transaction when the device select field matches with its unique device address, or otherwise forward the SPI transaction to a following slave in the chain.

10. The improved point-to-point SPI of claim 9, wherein the slaves are reset to a default address upon power-cycling, and the master enumerates the unique device address to each of the slaves.

11. The improved point-to-point SPI of claim 3, wherein the target slave is configured to drive the data output line to the first logic state after receiving the chip select signal.

12. The improved point-to-point SPI of claim 3, wherein the master clocks-in data via multiple data lines.

13. A method for communicating data between a master and a plurality of slaves linked in a chain, wherein the master only connects to a first slave in the chain via said serial peripheral interface (SPI), the method comprising: initiating a SPI transaction by providing a set of SPI signals from the master to the first slave in the chain, wherein the first n-bits of data transferred in said SPI transaction include a device selection field for identifying a target slave in the chain to process the SPI transaction; and forwarding the entire set of SPI signals to the target slave via one or more of intermediate slaves in the chain, wherein each slave is configured to receive and forward the entire set of SPI signals unless the slave is determined as the target slave, wherein the SPI comprises:
  data input and data output pins, each of which is configured to send and receive signals to and from a respective data input and data output line;
  a serial clock (SCLK) pin configured to receive a SCLK signal on a SCLK line; and
  a chip select (CS) pin configured to receive a CS signal on a CS line, and
  wherein upon receiving a read command, the target slave generates a slave ready signal on the SPI data output line to the master to indicate the target slave is ready to process the SPI transaction.

14. The method of claim 13, wherein the target slave drives the data output line to a first logic state and when the target slave is ready to return data on the data output line, drives the data output line to a second logic state.

15. The method of claim 13, wherein each slave forwards the set of SPI signals as soon as the slave determines that the SPI transaction is not intended for itself.

16. The method of claim 15, wherein each slave forwards the set of SPI signals by providing the set of SPI signals on a SPI forwarding port as soon as the signals are received at a SPI receiving port.

17. The method of claim 14, wherein the target slave drives the data output line to the first logic state after receiving an address.

18. The method of claim 14, wherein the target slave drives the data output line to the first logic state after receiving the chip select signal.

19. The method of claim 14, wherein the master clocks-in data after confirming the slave ready signal.

20. An improved point-to-point serial peripheral interface (SPI) for communicating data between a master and a plurality of slaves linked in a chain, wherein said SPI comprises:
  a serial clock pin (SCLK) configured to send or receive an SCLK signal via a SCLK line;
  a chip select (CS) pin configured to send a CS signal via a CS line; and
  a master-out-slave-in (MOSI) pin and a master-in-slave-out (MISO) pin, configured to receive and send data signals through respective MOSI and MISO data lines,
  wherein the master only connects to a first slave in the chain via said serial peripheral interface and wherein each of the slaves is configured to forward an entire set of SPI signals received from its preceding device in the chain to another slave in the chain, wherein forwarding the entire set of SPI signals is delayed by sufficient time for re-clocking the SPI signals, and wherein each slave is configured to provide a slave ready signal to the master through said chain to indicate that the slave is ready to process a SPI transaction wherein the target slave provides the slave ready signal to the master when the target slave is ready to return valid data and wherein said one or more of data lines comprises a master-out-slave-in (MOSI) line and a master-in-slave-out (MISO) line, and wherein the target slave is configured to change the state of the MISO line for providing the slave ready signal to the master.

21. The improved point-to-point SPI of claim 20, wherein the master initiates the SPI transaction by providing a set of SPI signals to one of the slaves, and when more than one slave is linked to the master, each slave is configured to forward the set of SPI signals to another slave until the set of SPI signals reach to a target slave.

22. The improved point-to-point SPI of claim 21, wherein the first n-bits of data transferred via said data lines contain a device select field for identifying the target slave for the SPI transaction.

23. The improved point-to-point SPI of claim 22, wherein the master initiates the SPI transaction after confirming the slave ready signal on one or more of the data lines.

24. The improved point-to-point SPI of claim 23, wherein the slaves are configured to provide the slave ready signal to the master upon being identified as the target slave.

25. The improved point-to-point SPI of claim 20, wherein the master clocks-in data after confirming the slave ready signal.

* * * * *